April 20, 1948.        T. R. STERCK        2,440,125
IMAGE-CARRYING FILM HAVING LIGHT-POLARIZING AND NONPOLARIZING IMAGES
Filed Dec. 15, 1944

INVENTOR.
Thomas R. Sterck
BY Donald C. Brown
Attorney

Patented Apr. 20, 1948

2,440,125

UNITED STATES PATENT OFFICE 2,440,125

IMAGE-CARRYING FILM HAVING LIGHT-POLARIZING AND NONPOLARIZING IMAGES

Thomas R. Sterck, Arlington, Mass., assignor to Polaroid Corporation, Cambridge, Mass., a corporation of Delaware Application December 15, 1944, Serial No. 568,238

5 Claims. (Cl. 88—65)

This invention relates to an image-carrying film which carries one or more dichroic and hence light-polarizing images as well as one or more non-polarizing images.

Important objects of the invention are to provide an image-carrying film having one or more light-polarizing images together with one or more non-polarizing images and especially a film which has an individual image-carrying layer for any light-polarizing image and an individual image-bearing layer for any non-polarizing image.

Other objects of the invention are to provide as a new article of manufacture, an image-carrying film in which there appears at least one light-polarizing image and at least one non-polarizing image, the film comprising a plurality of superposed light-transmitting or transparent layers and being in the form of a moving picture film or transparent slide as well as being susceptible of mounting upon a reflecting base or support as a reflection print; to provide educational and advertising media having at least two images, one of which may be rendered substantially invisible in polarized light; and to provide a film of a character described having at least one light-polarizing image formed in iodine or a dichroic dye in a layer of a transparent, molecularly oriented, hydrophilic, linear polymeric plastic such as molecularly oriented polyvinyl alcohol and having at least one non-polarizing image formed in silver in a layer of a transparent, hydrophilic material such as gelatin or polyvinyl alcohol or having a non-polarizing image-carrying layer which carries a non-polarizing image formed of a substantially non-dichroic dye or printing ink or the like.

With these and other objects in view, the invention consists in the various parts and combinations and to the special properties of the articles to be hereinafter set forth and claimed with the understanding that the different parts of the article, as well as the special features and properties thereof, may be varied in character and degree without departing from the spirit of the invention or exceeding the scope of the appended claims.

The above and other objects and novel features of this invention will more fully appear from the following detailed description when the same is read in connection with the accompanying drawings. It is to be expressly understood, however, that the drawings are for purposes of illustration only and are not intended as a definition of the limits of the invention, reference being primarily had for this latter purpose to the appended claims.

For a fuller understanding of the invention, reference should be had to the accompanying drawing in which.

Figure 1:
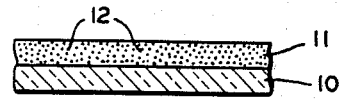
Fig. 1 is a diagrammatic view, in section, of a film portion having an image-carrying layer for non-polarizing images, the layer being shown as light-sensitized and before exposure.
Figure 2:
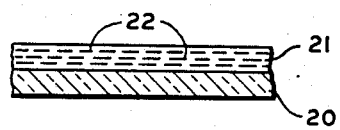
Fig. 2 is a diagrammatic view, similar to Fig. 1, of a film portion having an image-carrying layer for light-polarizing images, the layer being shown in molecularly oriented condition and before image formation.
Figure 4:
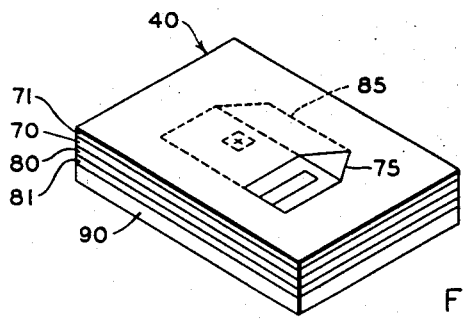
Figure 3:
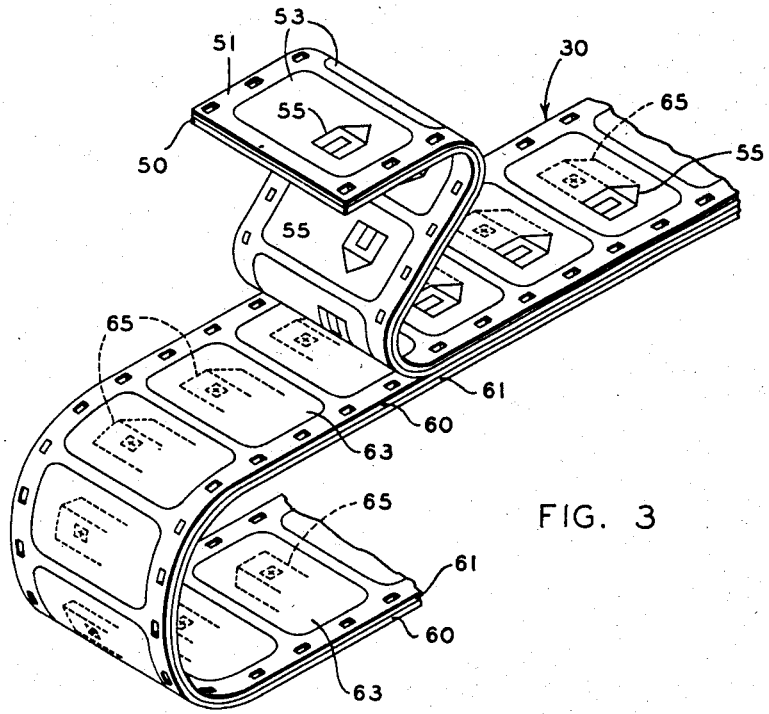

Fig. 3 is a diagrammatic representation of a moving picture film formed by laminating film portions similar to those of Figs. 1 and 2 and shows light-polarizing and non-polarizing images carried by the respective image-carrying layers of the film; and Fig. 4 is a diagrammatic representation of another embodiment of the invention and shows a reflection print having light-polarizing and non-polarizing images carried by the respective image-carrying layers thereof.

For educational and advertising purposes it is desirable to provide a moving picture film or a transparent slide or a reflection print having formed therein two normally visible images, one of which images may be rendered invisible when viewed in polarized light. For example, it is desirable to be able to add at will an auxiliary image in front or in back or on the sides of a main image, or to be able to present an auxiliary image and a main image in superposed relation to each other. The auxiliary image may be a part of the object portrayed in the main image, or it may be a different object entirely from that of the main image and may be shown as an accessory to the main image.

Instead of a single main image several of them may be used for each view to be reproduced. Similarly, one or more auxiliary images may be associated with a main image or with several main images. Thus a motion picture film may have one or more main images and one or more auxiliary images in each of certain predetermined frames thereof, or a transparent slide or reflection print may have one or more main images and one or more associated auxiliary images. To simplify the description of the invention, sets of a single main image and an associated auxiliary image will be considered, the manner of forming sets of images having one or more main and auxiliary images becoming apparent in connection with the following explanation.

The present invention fulfills this desire by providing an image-carrying film having, or capable of having, at least two images carried thereby. In the event the photographic element is a moving picture film, at least two images are formed in each frame or in predetermined frames thereof. One of the images of each of such pair of images is of a non-polarizing character and is always visible. This will be considered as the main image. The other image, which will be considered as the auxiliary image, is a dichroic image and hence light-polarizing. This light-polarizing image shows a photographic contrast which is a function of the direction of vibration of light incident thereon. As a result of this expedient, the auxiliary or light-polarizing image may be rendered invisible when the film is viewed in plane polarized light which is vibrating in a plane parallel to the polarizing axis of the auxiliary image. Also the light-polarizing image may be rendered invisible in circularly polarized light when properly positioned birefringent quarter wave retardation material is associated with the film on the side of the light-polarizing image nearest the observer and the film is observed through a suitably oriented circular polarizer.

The usefulness of the invention may be illustrated in connection with an educational moving picture film. For example, in teaching mechanical drawing it may be desirable to show an end view of an object and in certain frames of the film show how lines added to the end view can convert it into a perspective view. The present invention is well adapted for this purpose. Normal or non-polarizing images of the end view of the object are formed in the various frames of the film and in desired frames there are formed light-polarizing images of the lines which provide the structure needed to convert the end view of the object to a perspective view.

Normally, the two sets of images will be observed on the screen to give a perspective view when any portion of the film in which both sets of images appear is projected. Making the added structure invisible is possible since each image which provides it is light-polarizing. Hence if the film is projected with light which is polarized in a plane parallel to the polarizing axis of each light-polarizing image, the latter will be blanked out and the observer will only see the non-polarizing images of the end view of the object.

The film may be projected in unpolarized or polarized light for the purpose of exhibiting or displaying it. When the film is projected in polarized light both the non-polarizing and the light-polarizing images are visible. To render each light-polarizing image invisible, a plane polarizer may be placed in the path of the projected beam, the polarizing axis of the filter being arranged so that it is in crossed relation to the polarizing axis of the light-polarizing image. If the film is projected in polarized light which is vibrating in a plane perpendicular to the polarizing axis of the light-polarizing image, both the non-polarizing and polarizing images are visible. This permits a polarizing filter to be mounted in the projected beam so that it may be rotated into a position wherein its polarizing axis is perpendicular or parallel to the polarizing axis of the light-polarizing image or images to the end of controlling the disappearance of the light-polarizing image or images. Similar effects are obtained in connection with a reflection print by viewing it through a suitably oriented polarizing filter.

In carrying the invention into effect use is made of two film portions which, after separate treatment to provide each of them with one or more images, are laminated together in suitable registration to provide the desired film. Fig. 1 shows the film portion which carries the non-polarizing images and comprises a transparent support or base 10 having a transparent image-carrying layer 11 supported thereby. Layer 11 may function as a carrier for a photosensitive material, Fig. 1 portraying this portion of the film in sensitized condition as indicated by dots 12 which represent photosensitive material dispersed throughout the layer.

Fig. 2 shows the film portion which carries the light-polarizing images and comprises a transparent support or base 20 and a transparent image-carrying layer 21 supported thereby. The layer 21 has its molecules in a substantially oriented condition as indicated by the dashes 22 and is ready to have light-polarizing images formed therein.

Image-carrying layer 11 may be formed of any suitable transparent, hydrophilic material in which the photosensitive substance 12 is incorporated. Preferred layer-forming materials of this purpose are gelatin and polyvinyl alcohol. However, other hydrophilic plastics, such for example as those to be hereinafter named may be employed.

It is known that transparent, hydrophilic plastics having substantially oriented, long chain molecules may be rendered light-polarizing by staining or dyeing them with a dichroic stain or dye. Material possessing this property is utilized for the layer 21 which is formed of a molecularly oriented sheet of a transparent, high molecular weight polymer adapted to form a dichroic sorption complex with certain organic dyes, the polymer preferably being one which contains hydroxy groups. Examples of suitable polymers are polyvinyl alcohol, polyhydroxy alkane, partially hydrolyzed polyvinyl acetals and polyvinyl alcohol esters, and regenerated cellulose. Of the materials falling within this class, polyvinyl alcohol is preferred since light-polarizing images formed in a properly prepared sheet of that material possess very high dichroism.

As already mentioned hydrophilic plastics of the kind just named may also be used for forming the layer 11 in which event the hereinafter described treatment to orient their molecules is preferably omitted.

Orientation of a plastic sheet suitable for use in the layer 21 which carries one or more light-polarizing images may be effected by stretching the sheet until the molecules therein are sufficiently oriented. Alternatively, the surface molecules of one or both sides of a plastic sheet may be oriented as by application of linear, frictional forces thereto without orienting the molecules throughout the remainder of the sheet. In surface orientation, the oriented region adjacent the surface is of sufficient thickness to give dichroism when stained or dyed. The dichroic stain or dye and therefore any dichroic image derived therefrom should not, in the case of surface orientation, penetrate beyond the oriented region and into the unoriented region of the plastic.

The bases or supports 10 and 20 for the image-bearing layers are preferably formed of a transparent plastic other than gelatin. Glass is included as a support-forming material. Examples of suitable support materials formed of plastic comprises a cellulosic plastic, such as cellulose acetate and cellulose nitrate, vinyl compounds, such as the vinyl acetate-vinyl chloride copolymers, or a condensation type superpolymer, such as a polyamide or nylon type plastic. Cellulose nitrate and cellulose acetate may be mentioned as being especially suited for this purpose. In addition, any of the plastics named for forming the image-carrying layer 21 may be employed for the supports 10 and 20.

The image-carrying layers 11 and 21 are suitably bonded to their respective supports and as will hereinafter appear, the portions of the film shown in Figs. 1 and 2 are mounted upon each other and laminated after image formation. Gelatin when used as an image-bearing layer can be suitably adhered to the support by well known methods. Polyvinyl alcohol can be laminated to cellulose nitrate with water when the cellulose nitrate is subcoated with a suitable partially hydrolyzed polyvinyl acetate, for example a material of this character which is about 77% hydrolyzed and of relatively high viscosity. Cellulose acetate can be subcoated first with cellulose nitrate and then with a partially hydrolyzed polyvinyl acetate of the character described for lamination to polyvinyl alcohol, water being used as the laminating agent. Polyvinyl alcohol can be laminated to polyvinyl alcohol or regenerated cellulose with water in the event either of the two last-named plastics is employed to form the support layers of the photographic element.

Support materials such as cellulose nitrate may be laminated to themselves, and also cellulose acetate may be laminated to itself by the use of solvents as laminating agents. For example, acetone or a mixture of methanol and ethyl acetate may be used.

Suitable dopes may also be employed for laminating cellulose nitrate to cellulose nitrate or cellulose acetate to cellulose acetate.

Silver halides as a class are intended for use with the invention for the formation of the non-polarizing images. Preferred silver halides are silver chloride, or silver bromide or mixtures thereof. Silver iodide, usually in small quantities, may be included to increase the sensitivity of these compounds or mixtures thereof. Silver halide is formed by the customary reaction which takes place when solutions of alkali halide and silver nitrate are mixed. Incorporation of the silver halide within a gelatin emulsion or plastic dope, which is to form an image-carrying layer 11, may be effected by adding the sensitizing solutions thereto and then casting the sensitized carrier material into a sheet or by imbibing the sensitizing solutions into an already formed but unsensitized sheet.

The invention contemplates the use of materials other than silver halide for sensitizing the layer 11. As further examples, dichromates and diazo compounds may be named. However, for the purpose of the invention, silver halide is a preferred material which is simple to employ and process and which gives highly satisfactory results.

Materials other than the sensitizing solutions previously mentioned may be incorporated in the image bearing layer 11. For example, silver halide is primarily sensitive to blue and near ultra-violet light. A sensitizer is customarily added to silver halide emulsion to extend its range of sensitivity. As a conventional sensitizer for this purpose, mention may be made of the sensitizing material known as erythrosin. In addition to a sensitizer, hardening agents, plasticizers and the like can be incorporated in the image-bearing layer for the non-polarizing images.

As already indicated, the invention intends to provide photographic elements employable as motion picture or cut film which may be used as positive or negative forming film materials in providing transparencies or in producing reflection prints. When used for moving picture purposes, light-polarizing and non-polarizing images may be formed in each frame of the film or the light-polarizing images may be formed only in predetermined frames.

Formation of a motion picture film will be described by way of explaining the invention, it being understood that procedures similar to those set forth may be employed to produce a transparent slide or reflection print. In carrying out the invention, either the light-polarizing or the non-polarizing images are first formed in the separated film portions. After image formation, the film portions are laminated in suitable registration with each other.

Assuming the production of a positive moving picture film, the formation of images in the image-carrying layer which carries the non-polarizing images proceeds by differentially exposing the layer to light. When such a layer is sensitized with silver halide, the result of such exposure is to form latent images therein. Latent images are formed in the frames of an image-carrying layer sensitized with silver halide by standard printing methods making use of a negative film which contains the images to be reproduced. The negative film is located in proper register with the image-carrying layer. Exposure may be made onto the outer face of the layer or through the transparent support on which it is mounted. Subsequent to exposure the latent images are developed to silver images by conventional procedure after which the image bearing layer may be fixed in the usual manner.

If, as heretofore suggested, the image carrying layer 11 is formed of a transparent, hydrophilic material other than gelatin, for example, polyvinyl alcohol, standard printing practices may be utilized to apply a standard printing ink onto a surface of the layer whereby to provide one or more non-polarizing images for the layer. Likewise under such circumstances, a substantially non-dichroic dye may be applied to such a layer by printing methods or by imbibition practices to provide one or more non-polarizing images. By a substantially non-dichroic dye there is meant a dye which shows insufficient dichroism when incorporated in molecularly oriented material to provide a usable light-polarizing image.

Fig. 3 illustrates the results of the just described practices in connection with a moving picture film 30 having an image-carrying layer 51 which carries non-polarizing images 55 in separate frames 53 thereof. The layer 51 is similar to layer 11 of Fig. 1 and is supported on a transparent support 50.

Formation of one or more light-polarizing images in the molecularly oriented image-carrying layer may be effected in the manner described in Patent No. 2,315,373 issued March 30, 1943, to E. H. Land, for Process for forming light-polarizing images, by printing on the layer with a wash-off gelatin relief which has been imbibed in a dichroic stain or dye. Images to be reproduced as dichroic or light-polarizing images are formed in the wash-off relief which is prepared by exposing colloid relief material through a negative of the film to be reproduced if a positive reproduction is desired. After exposure, the relief is developed and may be fixed by standard practices.

The developed relief, in which there is formed one or more images to be transferred to an oriented image-bearing layer, is imbibed in a suitable solution comprising a dichroic stain or dye. The imbibed relief is then placed on a molecularly oriented image-carrying layer in proper register therewith after which it is pressed into contact with the surface of such layer. The result is to provide in the molecularly oriented image-carrying layer, a light-polarizing image in terms of a dichroic stain or dye in each area of the layer contacted by an image in the wash-off relief. Each light-polarizing image produced in this manner displays a photographic contrast which is a function of the vibration direction of light incident on the image.

An excellent dichroic stain for use with the invention is one comprising iodine in combination with an iodide which forms with the iodine a polarizing polyiodide. Suitable iodides for use in the preparation of such a stain are, for example, sodium iodide and ammonium iodide. They are preferably employed with a relatively small amount of iodine. A suitable solution, for example, for staining polyvinyl alcohol, may be formed by preparing a solution of 20 grams of ammonium iodide in 100 cc. of water, dissolving therein 1.0 gram of iodine, and adding thereto a solution of 50 grams of ammonium iodide in 500 cc. of water. Other quantities of the iodine may be used. By altering the quantity of the iodide employed, predetermined changes in the extinction color of the image formed may be obtained. Stains produced from solutions of iodine and iodides are described as stains formed by polarizing polyiodides.

Dyes suitable for forming light-polarizing images comprise water soluble, dichroic dyes such, for example, as direct cotton dyes of the azo type, or dichroic dyes prepared from fast color salts. Such dyes should be selected for their ability to show high dichroism when applied to a properly oriented sheet of a plastic such as polyvinyl alcohol, and preferred examples thereof will be found, with few exceptions in the disazo, trisazo, stilbene, thiazole and pyrazolone groups. Dyes of this character may be used singly for the production of monochromatic images or in combination or mixtures to produce various color effects.

As particular examples of dyes, mention is made of Red 8 BL (Colour Index 278); Pink 4 BL (Colour Index 353); Erie Yellow Y (Colour Index 365); Stilbene Yellow (Colour Index 622); Yellow FF (Colour Index 814); Sky Blue 6 BX greenish (Colour Index 518); Niagara Sky Blue 6B (Colour Index 518); and Erie Black GXOO (Colour Index 581).

The results of the just described practices are illustrated in the motion picture film 30 of Fig. 3 wherein there is shown an oriented image-carrying layer 61 which carries light-polarizing images 65 in separate frames 63 thereof. The layer 61 is similar to layer 21 of Fig. 2 and is supported on a transparent support 60. For the purpose of distinguishing light-polarizing images 65 from the non-polarizing images, the former are shown in dash lines. As already indicated after formation of the sets of different images, the separate portions of the film are laminated to each other in suitable registration. The right hand end of Fig. 3 shows the appearance of the film after lamination. While the film 30 has been disclosed as laminated to have the image-carrying layers as outer layers, the invention comprehends practices whereby either of the image-carrying layers 51 or 61 is laminated to a support for the other layer so that only one image bearing layer is on the outside of the film.

In the frames of the film 30 of Fig. 3, the image of a drawing of an end elevation of a house is shown as a silver or non-polarizing image 55 and is illustrated in full lines as contained in the image-carrying layer 51. Also in frames of the film 30, structure necessary to complete a perspective of the house is shown in dash lines as providing a light-polarizing image 65 which is located in the image-carrying layer 61. In film 30, each non-polarizing image 55 will always be visible while each light-polarizing image 65 may be made to appear and disappear in accordance with the vibration direction of light incident thereon.

For the sake of simplicity of illustration, the images in Fig. 3 have been shown as forming a line drawing. It is to be understood however, that the concept of the invention extends to all types of photographic reproduction and is intended to include halftone and full tone reproductions. In this regard it is to be noted that images other than those shown as forming a house may be formed by the practice of the invention and the term "image" as used herein is intended to cover any design, indicium or the like or a part thereof.

It has been noted that the invention may be employed for the production of reflection prints. A print 40 of this type is shown in Fig. 4 as comprising a support 70 for an image-carrying layer 71 in which a non-polarizing image 75 is carried. The layer 71 and its support 70 are superposed upon a support 80 which carries a molecularly oriented image-carrying layer 81 in which a light-polarizing image 85 appears. Image-carrying layers 71 and 81 and supports 70 and 80 are substantially similar to the respective supports and image-carrying layers in Figs. 1 and 2. The images just described, which disclose the house shown in the frames of the motion picture film 30, are formed by practices similar to those already outlined. The laminated layers and supports are superposed on a light-reflecting backing 90 for the purpose of forming a reflection print. The backing 90 may be formed of metalized paper or other reflecting media and layer 81 is suitably laminated thereto. In this modification of the invention, the non-polarizing image 75 will always be visible while the light-polarizing image 85 may be caused to appear and disappear at will when the print is viewed in suitably polarized light.

As will be well understood by the art, variations may be made in the photographic films herein described. For example, if the respective image-bearing layers of the various embodiments of the invention are formed of a plastic material such as polyvinyl alcohol and are made sufficiently thick their respective supports or bases may be dispensed with. Likewise while the carrier for the non-polarizing images has been described as a single layer, several layers may be employed. It is also possible, as heretofore intimated, to employ circular polarizers and circularly polarized light for viewing purposes. In using circularly polarized light, one of the supports for either image bearing layer of the film, when these supports are directly adjacent each other, may be rendered birefringent by suitable stretching to provide the well known quarter wave retardation effect on polarized light transmitted therethrough and the layer which carries the light-polarizing image may have its molecules oriented at 45° to an edge of the film.

It has been pointed out that a light-polarizing or dichroic image has an optical density which is a function of the direction of vibration of light incident thereon. This is true of each light-polarizing image produced in all embodiments of the invention. Such images are known as "vectographs," and it is to be understood that the invention embraces within its scope the combination of a vectograph image and a non-polarizing or ordinary image.

Throughout the specification and claims where the term "hydrophilic" is employed, reference is made to layers for a photographic element or film which are formed of a substance or material that shows an affinity for water or has the ability to absorb or adsorb water.

The term "dichroism" is used herein and in the claims as meaning the property of differential adsorption of the components of an incident beam of light depending upon the vibration directions of said components.

Likewise, throughout the specification and claims the term "dichroic" as applied to a material or a dye or a stain means a material or a dye or a stain whose molecules possess the property of showing dichroism. In the practice of the invention, this property is displayed when such material or dye or stain is incorporated in molecularly oriented hydrophilic plastics of the character described in that the resulting areas containing the same show dichroism.

Also as used in the specification and claims, the term "polarizing axis" is applied to a material which will transmit unpolarized light in a polarized condition and means the axis of such material to which the direction of vibration of plane polarized light must be parallel in order that the plane polarized light be transmitted through the material.

In achieving the aims and objects of the invention it will be appreciated that there has been provided novel image-carrying film having at least two images, one of which may be caused to appear and to disappear as desired and more particularly a film of this character having two superposed image-carrying layers one of which has one or more light-polarizing or dichroic images while the other has one or more non-polarizing images and also that there has been provided a process for forming such a film.

Since certain changes may be made in the above product and different embodiments of the invention could be made without departing from the scope thereof, it is intended that all matter contained in the above description, or shown in the accompanying drawing shall be interpreted as illustrative and not in a limiting sense.

What is claimed is:

1. An image-carrying film which is designed for instructional and educational purposes and which carries at least one main image and an auxiliary image in association therewith, a main image and an auxiliary image associated therewith being viewable conjointly to form a composite image and said auxiliary image having the property of being rendered invisible as desired, said film comprising two substantially transparent and coextensive image-carrying layers superposed on one another, one of said image-carrying layers being formed of a molecularly oriented, hydrophilic, linear polymeric plastic material and the other of said image-carrying layers being formed of a transparent hydrophilic plastic material, at least one predetermined portion of the molecularly oriented material having carried thereby a light-polarizing image constituting said auxiliary image and at least one predetermined portion of the other hydrophilic material having carried thereby a nonpolarizing image constituting said main image with which said auxiliary image is associated, said light-polarizing auxiliary image having the property of absorbing light which is incident thereon and which is polarized in a predetermined plane while transmitting incident light which is polarized in a plane at 90° to said first-named plane and also transmitting unpolarized light whereby said nonpolarizing main image and said light-polarizing auxiliary image associated therewith become simultaneously visible and form at least one composite image when viewed conjointly in unpolarized light as well as in light vibrating in said first-named plane but whereby said light-polarizing auxiliary image becomes substantially invisible when viewed in polarized light vibrating in said second-named plane while said nonpolarizing main image remains visible.

2. An image-carrying film which is designed for instructional and educational purposes and which carries at least one main image and an auxiliary image in association therewith, a main image and an auxiliary image associated therewith being viewable conjointly to form a composite image and said auxiliary image having the property of being rendered invisible as desired, said film comprising two substantially transparent, hydrophilic and coextensive image-carrying layers superposed on one another, one of said image-carrying layers being formed of molecularly oriented polyvinyl alcohol and the other of said image-carrying layers being formed of a transparent hydrophilic plastic material, at least one predetermined portion of the molecularly oriented material having carried thereby a light-polarizing image constituting said auxiliary image and at least one predetermined portion of the other hydrophilic material having carried thereby a nonpolarizing image constituting said main image with which said auxiliary image is associated, said light-polarizing auxiliary image having the property of absorbing light which is incident thereon and which is polarized in a predetermined plane while transmitting light which is polarized in a plane at 90° to said first-named plane and also transmitting unpolarized light whereby said nonpolarizing main image and said light-polarizing auxiliary image associated therewith become simultaneously visible and form at least one composite image when viewed conjointly in unpolarized light as well as in light vibrating in said first-named plane but whereby said light-polarizing auxiliary image becomes substantially invisible when viewed in polarized light vibrating in said second-named plane while said nonpolarizing main image remains visible.

3. An image-carrying film which is designed for instructional and educational purposes and which carries at least one main image and an auxiliary image in association therewith, a main image and an auxiliary image associated therewith being viewable conjointly to form a composite image and said auxiliary image having the property of being rendered invisible as desired, said film comprising two substantially transparent, hydrophilic and coextensive image-carrying layers superposed on one another, one of said image-carrying layers being formed of a molecularly oriented, hydrophilic, linear polymeric plastic material and the other of said image-carrying layers being formed of gelatin, at least one predetermined portion of the molecularly oriented material having carried thereby a light-polarizing image constituting said auxiliary image and at least one predetermined portion of the other hydrophilic material having carried thereby a nonpolarizing image constituting said main image with which said auxiliary image is associated, said light-polarizing auxiliary image having the property of absorbing light which is incident thereon and which is polarized in a predetermined plane while transmitting incident light which is polarized in a plane at 90° to said first-named plane and also transmitting unpolarized light whereby said nonpolarizing main image and said light-polarizing auxiliary image associated therewith become simultaneously visible and form at least one composite image when viewed conjointly in unpolarized light as well as in light vibrating in said first-named plane but whereby said light-polarizing auxiliary image becomes substantially invisible when viewed in polarized light vibrating in said second-named plane while said nonpolarizing main image remains visible.

4. An image-carrying film which is designed for instructional and educational purposes and which carries at least one main image and an auxiliary image in association therewith, a main image and an auxiliary image associated therewith being viewable conjointly to form a composite image and said auxiliary image having the property of being rendered invisible as desired, said film comprising two substantially transparent, hydrophilic and coextensive image-carrying layers superposed on one another, one of said image-carrying layers being formed of molecularly oriented polyvinyl alcohol and the other of said image-carrying layers being formed of gelatin, at least one predetermined portion of the molecularly oriented material having carried thereby a light-polarizing image constituting said auxiliary image and at least one predetermined portion of the other hydrophilic material having carried thereby a nonpolarizing image constituting said main image with which said auxiliary image is associated, said light-polarizing auxiliary image having the property of absorbing light which is incident thereon and which is polarized in a predetermined plane while transmitting incident light which is polarized in a plane at 90° to said first-named plane and also transmitting unpolarized light whereby said nonpolarizing main image and said light-polarizing auxiliary image associated therewith become simultaneously visible and form at least one composite image when viewed conjointly in unpolarized light as well as in light vibrating in said first-named plane but whereby said light-polarizing auxiliary image becomes substantially invisible when viewed in polarized light vibrating in said second-named plane while said nonpolarizing main image remains visible.

5. An image-carrying film which is designed for instructional and educational purposes and which carries at least one main image and an auxiliary image in association therewith, a main image and an auxiliary image associated therewith being viewable conjointly to form a composite image and said auxiliary image having the property of being rendered invisible as desired, said film comprising two substantially transparent, hydrophilic and coextensive image-carrying layers superposed on one another, one of said image-carrying layers being formed of molecularly oriented polyvinyl alcohol and the other of said image-carrying layers being formed of substantially unoriented polyvinyl alcohol, at least one predetermined portion of the molecularly oriented material having carried thereby a light-polarizing image constituting said auxiliary image and at least one predetermined portion of the other hydrophilic material having carried thereby a nonpolarizing image constituting said main image with which said auxiliary image is associated, said light-polarizing auxiliary image having the property of absorbing light which is incident thereon and which is polarized in a predetermined plane while transmitting incident light which is polarized in a plane at 90° to said first-named plane and also transmitting unpolarized light whereby said nonpolarizing main image and said light-polarizing auxiliary image associated therewith become simultaneously visible and form at least one composite image when viewed conjointly in unpolarized light as well as in light vibrating in said first-named plane but whereby said light-polarizing auxiliary image becomes substantially invisible when viewed in polarized light vibrating in said second-named plane while said nonpolarizing main image remain visible.

THOMAS R. STERCK.

REFERENCES CITED

The following references are of record in the file of this patent:

UNITED STATES PATENTS

| Number | Name | Date |
|--------|------|------|
| 2,034,230 | Dieterich et el. | Mar. 17, 1936 |
| 2,165,974 | Land | July 11, 1939 |
| 2,203,687 | Land et al. | June 11, 1940 |
| 2,238,207 | Ames, Jr., et al. | Apr. 15, 1941 |
| 2,280,297 | Neumueller et al. | Apr. 21, 1942 |
| 2,289,714 | Land | July 14, 1942 |
| 2,289,715 | Land | July 14, 1942 |
| 2,299,906 | Land | Oct. 27, 1942 |
| 2,315,373 | Land | Mar. 30, 1943 |
| 2,360,225 | Hanson, Jr., et al. | Oct. 10, 1944 |

Certificate of Correction

Patent No. 2,440,125            April 20, 1948

THOMAS R. STERCK

It is hereby certified that error appears in the printed specification of the above numbered patent requiring correction as follows:

Column 5, line 2, for the word "comprises" read *comprise*; column 9, line 22, for "adsorption" read *absorption*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*